(12) United States Patent
Kumano et al.

(10) Patent No.: US 9,297,526 B2
(45) Date of Patent: Mar. 29, 2016

(54) LIGHT SOURCE APPARATUS

(71) Applicant: Mitsubishi Electric Corporation, Tokyo (JP)

(72) Inventors: Koji Kumano, Tokyo (JP); Makoto Kuriaki, Tokyo (JP); Takumi Kijima, Tokyo (JP); Yasuhito Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 13/898,562

(22) Filed: May 21, 2013

(65) Prior Publication Data

US 2013/0334966 A1 Dec. 19, 2013

(30) Foreign Application Priority Data

Jun. 15, 2012 (JP) ............................. JP2012-135649

(51) Int. Cl.

| | |
|---|---|
| H05B 37/02 | (2006.01) |
| F21V 29/00 | (2015.01) |
| G03B 21/16 | (2006.01) |
| G03B 21/20 | (2006.01) |
| H04N 9/31 | (2006.01) |
| F21V 23/04 | (2006.01) |
| H05B 33/08 | (2006.01) |
| F21Y 101/02 | (2006.01) |

(52) U.S. Cl.
CPC ............. *F21V 29/20* (2013.01); *F21V 23/0457* (2013.01); *F21V 29/30* (2013.01); *F21V 29/40* (2013.01); *G03B 21/16* (2013.01); *G03B 21/2033* (2013.01); *H04N 9/3144* (2013.01); *H04N 9/3161* (2013.01); *H04N 9/3194* (2013.01); *F21Y 2101/025* (2013.01); *H05B 33/0815* (2013.01); *H05B 33/0842* (2013.01); *H05B 33/0845* (2013.01); *H05B 37/02* (2013.01)

(58) Field of Classification Search
None
See application file for complete search history.

(56) References Cited

U.S. PATENT DOCUMENTS

| | | | | |
|---|---|---|---|---|
| 6,960,759 | B2 * | 11/2005 | Konagaya | ...................... 250/238 |
| 2011/0025985 | A1 | 2/2011 | Karasawa | |
| 2011/0037954 | A1 | 2/2011 | Tsuchiya et al. | |
| 2013/0003382 | A1* | 1/2013 | Ohura et al. | ................... 362/253 |
| 2013/0070208 | A1* | 3/2013 | Nakanishi | ........................ 353/31 |
| 2014/0186215 | A1* | 7/2014 | Shinta et al. | ..................... 422/69 |

FOREIGN PATENT DOCUMENTS

| | | |
|---|---|---|
| CN | 101071259 A | 11/2007 |
| CN | 101978319 A | 2/2011 |
| JP | 3315461 B2 | 8/2002 |
| JP | 2003-035932 A | 2/2003 |
| JP | 2005-115220 | 4/2005 |
| JP | 2010-256558 A | 11/2010 |
| KR | 10-2011-0013260 A | 2/2011 |
| WO | WO 2011/148507 A1 | 1/2011 |

* cited by examiner

*Primary Examiner* — Tuan T Lam

(74) *Attorney, Agent, or Firm* — Birch, Stewart, Kolasch & Birch, LLP

(57) ABSTRACT

A light source apparatus includes a cooling mechanism driving portion for driving a cooling mechanism in such a manner that an element temperature of a light source element which is detected by an element temperature detecting portion reaches a target temperature, and a control portion for calculating a dew point temperature of the cooling mechanism and controlling the cooling mechanism driving portion and a light source element driving portion by using the calculated dew point temperature and the element temperature.

6 Claims, 2 Drawing Sheets

LIGHT SOURCE APPARATUS

BACKGROUND OF THE INVENTION

1. Field of the Invention

The present invention relates to a light source apparatus having a structure for controlling a temperature of a light source element.

2. Description of the Background Art

In recent years, in a light source apparatus such as a projector, an LED (Light Emitting Diode) element, a laser element (a semiconductor laser element) or the like is used in place of a conventional lamp light source based on a demand for increase in lifetime and power of a light source element. Each of the LED element and the laser element will be hereinafter referred to as a light source element.

The light source element has a characteristic that the output and the lifetime are reduced if a temperature is raised. Therefore, in order to maintain long lifetime and high power in the light source element, it is necessary to hold the temperature of the light source element to be low. A Peltier element, a cooling mechanism of a water cooling type or the like is utilized as means for cooling the light source element. The temperature of the light source element will be hereinafter referred to as an element temperature.

Moreover, in the case in which the element temperature of the light source element is varied, moreover, a wavelength of an optical output of the light source element is changed. In the case in which the light source element is applied to a so-called video apparatus such as a projector, a change in the wavelength of the light source element varies a hue. For this reason, it is necessary to cause the element temperature to be as constant as possible.

In a cooling apparatus including a freezing machine having, as cooling means, a so-called Peltier element, chiller, compressor or the like, there is a possibility that a temperature of a cooling surface of the light source element might be lower than a dew point temperature determined by an ambient environment. The ambient environment includes an ambient temperature, an ambient humidity and the like. Moreover, the dew point temperature indicates a temperature at which condensation is started. In this case, there is a fear that peripheral components including a light source element and an electric circuit system might break down due to water droplets generated by the condensation.

Therefore, Japanese Patent No. 3315461 (Paragraphs 0025 to 0029, FIG. 4) discloses the technique for taking measures against condensation which copes with a change in an ambient environment (which will be hereinafter referred to as the related art A). In the related art A, the environmental temperature and the environmental humidity are detected by means of the air sensor provided in the apparatus and the saturated vapor pressure is estimated therefrom. When the vapor pressure of the outside air exceeds the saturated vapor pressure, the control of the Peltier element is stopped to prevent the condensation.

However, the related art A has the following problem. In the related art A, the vapor pressure of the outside air exceeds the saturated vapor pressure in the timing for stopping the control of the Peltier element (the cooling mechanism). In the same timing, there is a possibility that the condensation might have occurred.

Moreover, in the related art A, the control of the Peltier element is stopped. For this reason, the element temperature of the light source element cannot be maintained to be constant due to the rise in the temperature after the stoppage. For this reason, there is a problem in that the hue is shifted due to the change in the wavelength. Furthermore, in the state in which the control of the Peltier element is stopped, the element temperature of the light source element is raised. For this reason, there is also a fear that a defect such as reduction in the lifetime of the element or the breakdown of the element might be caused. In other words, the related art A has a problem in that the element temperature cannot be maintained to be constant in order to prevent the defect.

SUMMARY OF THE INVENTION

It is an object of the present invention to provide a light source apparatus capable of maintaining an element temperature of a light source element to be constant.

A first aspect of the present invention is directed to a light source apparatus including a light source element for emitting light, a light source element driving portion for driving the light source element, a cooling mechanism for cooling the light source element, an element temperature detecting portion for detecting an element temperature to be a temperature of the light source element, a cooling mechanism driving portion for driving the cooling mechanism in such a manner that the element temperature to be detected by the element temperature detecting portion reaches a target temperature, and a control portion for calculating a dew point temperature of the cooling mechanism and controlling the cooling mechanism driving portion and the light source element driving portion by using the calculated dew point temperature and the element temperature.

According to the present invention, the cooling mechanism driving portion drives the cooling mechanism in such a manner that the element temperature to be the temperature of the light source element reaches the target temperature. Consequently, the element temperature of the light source element can be maintained to be constant. Accordingly, it is possible to suppress a variation in a wavelength of light to be emitted by the light source element, a change in a hue of the light or the like. As a result, it is possible to suppress a color shift of the light emitted by the light source element.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
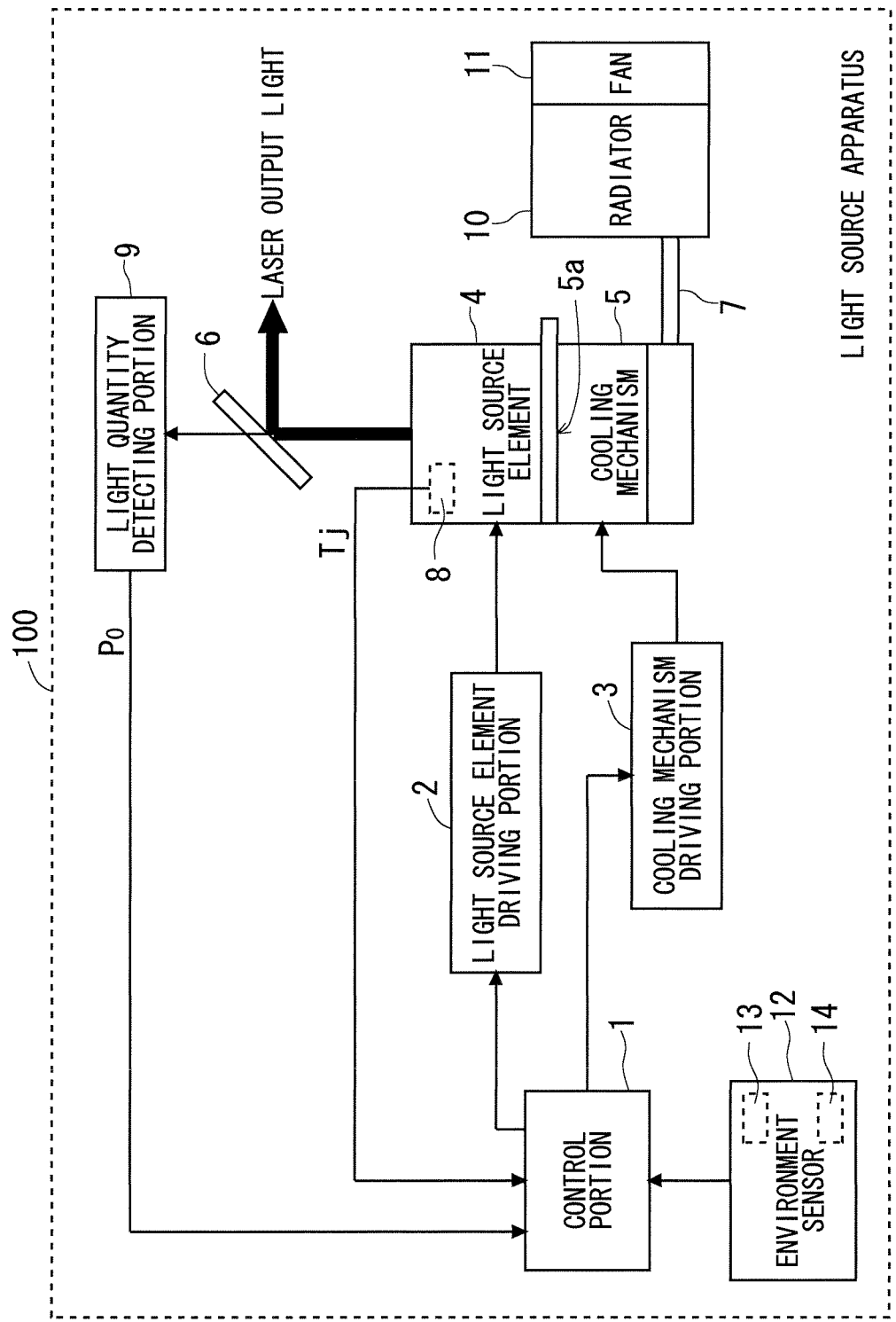
FIG. 1 is a block diagram showing a structure of a light source apparatus according to a first preferred embodiment.

A preferred embodiment according to the present invention will be described below with reference to the drawings. In the following description, the same components have the same reference numerals. Their names and functions are also the same. Accordingly, their detailed description will be omitted in some cases.

As an example according to the present invention, a preferred embodiment of a light source apparatus using a light source element will be described below in detail with reference to the drawings. The present invention is not restricted to the preferred embodiment.

<First Preferred Embodiment>

FIG. 1 is a block diagram showing a structure of a light source apparatus 100 according to a first preferred embodiment. As shown in FIG. 1, the light source apparatus 100 includes a light source element 4, a mirror 6, a light source element driving portion 2, a cooling mechanism 5, a heat pipe 7, a radiator 10, a fan 11, a cooling mechanism driving portion 3, a light quantity detecting portion 9, an element temperature detecting portion 8, a control portion 1 and an environment sensor 12.

The light source element 4 serves to emit light. The light source element 4 is a laser element (a laser light source element). The light source element 4 is not restricted to the laser element but may be an LED element, for example.

The light source element driving portion 2 applies a voltage to the light source element 4, thereby driving the light source element 4 (causing the light source element 4 to emit light) in accordance with control of the control portion 1. A driving current flows to the light source element 4 which is driven.

The mirror 6 reflects most of the light emitted from the light source element 4 and guides the reflected light as laser output light to an outside of the light source apparatus 100. Moreover, the mirror 6 guides, to the light quantity detecting portion 9, a part of the light emitted from the light source element 4. Consequently, the light quantity detecting portion 9 receives (detects) light which is proportional to an intensity of the laser output light.

The cooling mechanism 5 is disposed to cool the light source element 4. The cooling mechanism 5 is a Peltier element, for example. The cooling mechanism 5 is disposed to abut on the light source element 4. In the following, a portion of the cooling mechanism 5, abutting on the light source element 4, will be referred to as a cooling portion 5a. The cooling portion 5a serves to cool the light source element 4. In other words, the cooling mechanism 5 includes the cooling portion 5a for cooling the light source element 4. The cooling portion 5a abuts on the light source element 4 so as to generate a thermal resistance.

In the case in which the cooling mechanism 5 is a Peltier element, the cooling mechanism 5 abuts on the light source element 4 through a surface. In this case, the cooling portion 5a is also referred to as a cooling surface.

Moreover, the cooling mechanism 5 is thermally coupled to the radiator 10 through the heat pipe 7. The fan 11 generates a wind for discharging heat of the radiator 10 to an outside.

A part of heat generated by the light source element 4 is transmitted to the radiator 10 through the cooling mechanism 5 and the heat pipe 7. The heat transmitted to the radiator 10 is discharged to the outside of the light source apparatus 100 by means of the fan 11.

The cooling mechanism driving portion 3 drives the cooling mechanism 5. When the cooling mechanism 5 is driven, the light source element 4 is cooled. It is assumed that the cooling mechanism 5 is the Peltier element, for example. In this case, the cooling mechanism driving portion 3 applies, to the cooling mechanism 5 (the Peltier element), a voltage for causing the cooling mechanism 5 to generate a current, thereby driving the cooling mechanism 5.

The light quantity detecting portion 9 detects a light quantity of light radiated on the light quantity detecting portion 9 and detects a light quantity Po of light to be emitted by the light source element 4 based on the detected light quantity. A ratio of the light quantity of the light to be radiated on the light quantity detecting portion 9 to the light quantity of the light to be emitted by the light source element 4 has a predetermined value (for example, 1:9). Therefore, the light quantity detecting portion 9 can detect the light quantity Po of the light to be emitted by the light source element 4 based on the light quantity of the light which is radiated. The light quantity detecting portion 9 transmits the detected light quantity Po to the control portion 1.

The element temperature detecting portion 8 is thermally connected to the light source element 4. The element temperature detecting portion 8 detects a temperature of the light source element 4 (which will be hereinafter referred to as an element temperature Tj). The element temperature Tj is a junction temperature, for example. More specifically, the element temperature detecting portion 8 normally detects the temperature of the light source element 4 and transmits the element temperature Tj to the control portion 1.

The control portion 1 is a microcontroller (a microcomputer) such as a CPU. The control portion 1 controls the light source element driving portion 2 in such a manner that a light quantity (an intensity) of laser radiation is always constant. In other words, the control portion 1 controls the light source element driving portion 2 in such a manner that the optical output of the light source element 4 has a target value. More specifically, the control portion 1 gives the light source element driving portion 2 an instruction for a voltage to be applied to the light source element 4 by the light source element driving portion 2.

Moreover, the control portion 1 will be described below in detail. The control portion 1 controls the cooling mechanism driving portion 3 in such a manner that the element temperature Tj of the light source element 4 is generally constant at all times. The cooling mechanism driving portion 3 drives the cooling mechanism 5 in such a manner that the element temperature Tj to be detected by the element temperature detecting portion 8 reaches a predetermined target temperature in accordance with the control of the control portion 1. This is a necessary control for maintaining an oscillation wavelength or oscillation efficiency of the light source element 4 to be constant, and furthermore, holding the lifetime of the light source element 4.

The environment sensor 12 acquires information about the surrounding environment of the light source apparatus 100. The environment sensor 12 includes an ambient temperature detecting portion 13 and an ambient humidity detecting portion 14. Each of the ambient temperature detecting portion 13 and the ambient humidity detecting portion 14 does not need to be included in the environment sensor 12 and may be provided independently.

The ambient temperature detecting portion 13 detects an ambient temperature Tc (an outside air temperature) to be a surrounding temperature of the light source apparatus 100 at any time. The ambient temperature detecting portion 13 transmits the ambient temperature Tc to the control portion 1 at any time. The ambient humidity detecting portion 14 detects an ambient humidity Hc (an outside air relative humidity) to be a surrounding humidity of the light source apparatus 100 at any time. The ambient humidity detecting portion 14 transmits the ambient humidity Hc to the control portion 1 at any time.

The control portion 1 calculates a dew point temperature Tr of the cooling mechanism 5 (the cooling portion 5a) by using the ambient temperature Tc and the ambient humidity Hc. The dew point temperature indicates a temperature at which a saturated vapor pressure in the ambient environment reaches 100% so that condensation is started. As described above, the control portion 1 controls the cooling mechanism driving portion 3 in such a manner that the element temperature Tj of the light source element 4 generally becomes constant. Herein, a thermal resistance between the light source element 4 and the cooling portion 5a is represented by θjs. Moreover, a temperature of the cooling portion 5a is represented by Ts. A voltage to be applied to the light source element 4 is represented by Vf. Furthermore, a driving current of the light source element 4 is represented by Id. In addition, it is assumed that the element temperature Tj is constant. In this case, the following Equation 1 is satisfied.

$$(Vf \times Id - Po) \times \theta js = Tj - Ts \quad \text{(Equation 1)}$$

Id is expressed in the following Equation 2 which is obtained by deforming the Equation 1.

$$Id = \{(Tj - Ts)/\theta js + Po\}/Vf \quad \text{(Equation 2)}$$

Vf is not restricted to a voltage to be actually applied to the light source element 4. Vf may have a value obtained by expressing, in a tabular form or an approximation, a relationship between Id and Vf which are previously measured and reading out from a memory each time, for example. Moreover, Vf may be calculated by the control portion 1, for example. Furthermore, in the case in which dependency of Vf on Id is small, Vf may be treated as a certain value for simplicity.

In the following, the driving current Id of the light source element 4 corresponding to a critical temperature at which the condensation is started will also be written as a maximum driving current Idmax in the case in which the dew point temperature Tr is equal to the temperature Ts of the cooling portion 5a. Idmax is expressed in the following Equation 3 in which Ts in the Equation 2 is replaced with Tr.

$$Id\max = \{(Tj - Tr)/\theta js + Po\}/Vf \quad \text{(Equation 3)}$$

The control portion 1 calculates the maximum driving current Idmax in accordance with the Equation 3. Then, the control portion 1 compares the driving current Id of the light source element 4 with the maximum driving current Idmax. If Id is equal to or greater than Idmax as in the following Equation 4, the control portion 1 controls the light source element driving portion 2 in order to reduce a target value (a set value) of the light quantity Po. In the following, the target value of the light quantity Po will also be referred to as a light quantity target value.

$$Id \geq Id\max \quad \text{(Equation 4)}$$

A process for reducing or increasing the target value of the light quantity Po is executed by controlling the light source element driving portion 2 through the control portion 1 in such a manner that the value of the light quantity Po to be received from the light quantity detecting portion 9 is varied. In other words, the control portion 1 controls the light source element driving portion 2 in such a manner that the light source element driving portion 2 changes a voltage to be applied to the light source element 4 in order to vary the light quantity Po. More specifically, the control portion 1 controls the light source element driving portion 2 in such a manner that a value (a return value) of the newest light quantity Po to be received from the light quantity detecting portion 9 by the control portion 1 is a new target value.

When the light quantity target value is reduced, the driving current Id of the light source element 4 is reduced. Also when the light quantity Po is reduced, the control portion 1 controls the cooling mechanism driving portion 3 in such a manner that the element temperature Tj becomes constant as described above. Consequently, the element temperature Tj is maintained to be constant in such a manner that the condensation is not generated in the cooling portion 5a (the cooling surface). In other words, the control portion 1 controls the cooling mechanism driving portion 3 and the light source element driving portion 2 to control Ts and Id in such a manner that the following relational expressions of Equations 5 and 6 are satisfied. Consequently, it is possible to prevent the condensation from being generated in the cooling portion 5a (the cooling surface).

$$Tr < Ts \quad \text{(Equation 5)}$$

$$Ts = Tj - (Vf \times Id - Po) \times \theta js \quad \text{(Equation 6)}$$

Figure 2:
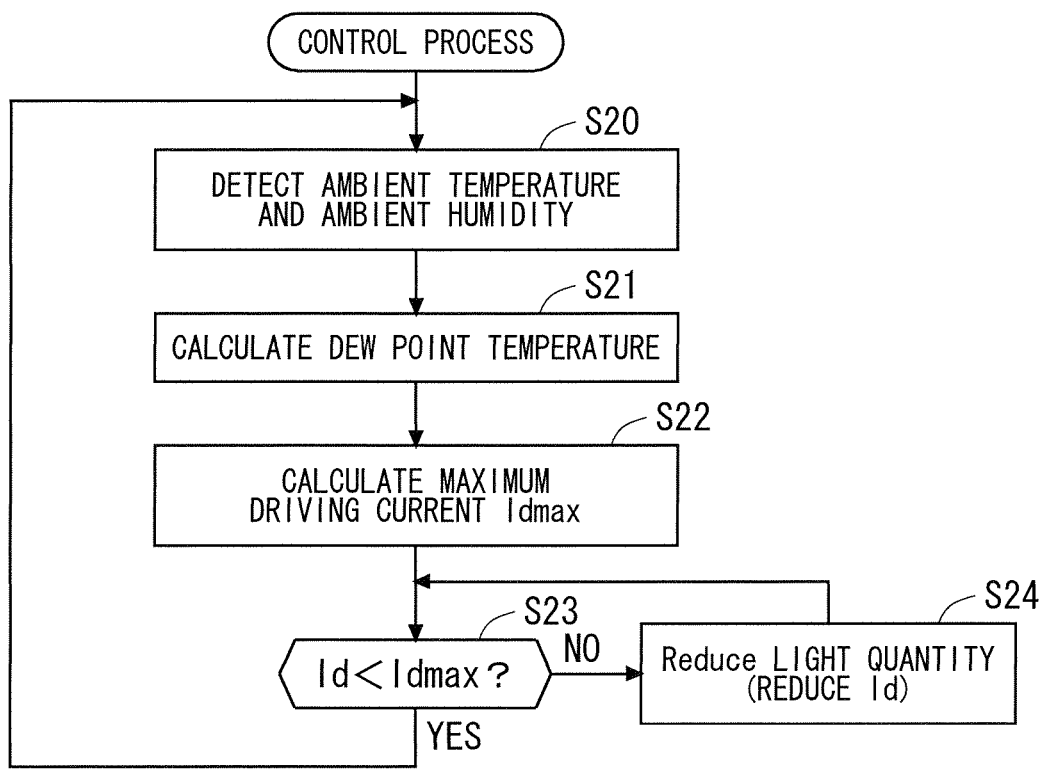
FIG. 2 is a flow chart showing a control process to be executed by the light source apparatus.

Next, description will be given to a process (hereinafter referred to as a control process) to be executed by the light source apparatus 100 according to the first preferred embodiment. FIG. 2 is a flow chart showing the control process.

As described above, the control portion 1 gives the light source element driving portion 2 the instruction for the voltage to be applied to the light source element 4 by the light source element driving portion 2. The control portion 1 prestores a voltage—current characteristic indicative of a current flowing to the light source element 4 depending on the voltage to be applied to the light source element 4. For this reason, the control portion 1 always grasps the driving current Id of the light source element 4 from the voltage to be applied by the light source element driving portion 2 based on the voltage—current characteristic.

In Step S20, the ambient temperature and the ambient humidity are detected. More specifically, the ambient temperature detecting portion 13 detects the ambient temperature Tc and transmits the ambient temperature Tc to the control portion 1. Moreover, the ambient humidity detecting portion 14 detects the ambient humidity Hc (the outside air relative humidity) and transmits the ambient humidity Hc to the control portion 1.

In Step S21, the control portion 1 calculates the dew point temperature Tr of the cooling mechanism 5 (the cooling portion 5a) by using the ambient temperature Tc and the ambient humidity Hc. Since a method of calculating a dew point temperature by using a temperature and a humidity is the well-known technique, detailed description will not be repeated.

In Step S22, the control portion 1 calculates the maximum driving current Idmax in accordance with the Equation 3 described above. The maximum driving current Idmax is a maximum driving current of the light source element 4 through which the temperature of the cooling portion 5a is not equal to or lower than the dew point temperature.

In Step S23, the control portion 1 judges whether the driving current Id is smaller than the maximum driving current Idmax or not. If a judgment of YES is made in step S23, the process of step S20 is executed again. Then, the processes of steps S20 to S23 are executed repetitively. On the other hand, if a judgment of NO is made in step S23, the process proceeds to Step S24. If a judgment of NO is made in step S23, the driving current Id is equal to or larger than the maximum driving current Idmax.

In step S24, the control portion 1 controls the light source element driving portion 2 to reduce the driving current Id. More specifically, the control portion 1 gives the light source element driving portion 2 an instruction for reducing the voltage to be applied to the light source element 4 through the light source element driving portion 2 by a predetermined value. The light source element driving portion 2 reduces the voltage to be applied to the light source element 4 by the predetermined value in accordance with the instruction. The predetermined value is 10% of the voltage to be applied by the light source element driving portion 2, for example. Consequently, the driving current Id is reduced. As a result, the light quantity Po of the light to be emitted by the light source element 4 is reduced. Thereafter, the process of step S23 is executed again.

The control portion 1 executes the following temperature control process independent of the control process in parallel. In the temperature control process, the control portion 1 controls the cooling mechanism driving portion 3 in such a manner that the element temperature Tj is constant as described above. In other words, the cooling mechanism driving portion 3 drives the cooling mechanism 5 in such a manner that the element temperature Tj to be detected by the temperature detecting portion 8 reaches a predetermined target temperature in accordance with the control of the control portion 1. More specifically, the cooling mechanism driving portion 3 drives the cooling mechanism 5 in such a manner that the element temperature Tj holds an almost target temperature.

In more detail, the dew point temperature of the cooling mechanism 5 (the cooling portion 5a) is represented by Tr, the temperature of the cooling portion 5a is represented by Ts, the voltage to be applied to the light source element 4 is represented by Vf, the driving current of the light source element 4 is represented by Id, the light quantity of the light to be emitted by the light source element 4 is represented by Po, the element temperature of the light source element 4 is represented by Tj, and the thermal resistance between the light source element 4 and the cooling portion 5a is represented by θjs.

In this case, the control portion 1 controls the cooling mechanism driving portion 3 and the light source element driving portion 2 to control Ts and Id in such a manner that the relational expressions of the Equations 5 and 6 are satisfied. More specifically, the control portion 1 controls the cooling mechanism driving portion 3 and the light source element driving portion 2 by using the newest dew point temperature Tr calculated in step S21 and the element temperature Tj. In other words, the control portion 1 controls the cooling mechanism driving portion 3 and the light source element driving portion 2 by using the dew point temperature Tr and the element temperature Tj.

Consequently, the cooling mechanism driving portion 3 drives the cooling mechanism 5 in such a manner that the temperature of the cooling portion 5a maintains a higher temperature than the dew point temperature of the cooling mechanism 5 in accordance with the control of the control portion 1. Moreover, the cooling mechanism driving portion 3 controls the voltage (input power) to be applied to the light source element 4 in such a manner that the temperature of the cooling portion 5a is not lower than the dew point temperature. For example, the cooling mechanism driving portion 3 suppress the voltage (the input power) to be applied to the light source element 4.

As described above, according to the present preferred embodiment, the cooling mechanism driving portion 3 drives the cooling mechanism 5 in such a manner that the element temperature of the light source element 4 reaches a target temperature. More specifically, the cooling mechanism driving portion 3 drives the cooling mechanism 5 in such a manner that the element temperature Tj holds an almost target temperature. Consequently, it is possible to maintain the element temperature Tj of the light source element 4 to be constant. Accordingly, it is possible to suppress a variation in the wavelength of the light to be emitted by the light source element 4, a change in a hue or the like. In other words, the wavelength of the light to be emitted by the light source element 4 can be maintained to be constant. As a result, it is possible to suppress a color shift of the light to be emitted by the light source element 4. Moreover, it is possible to prevent reduction in the lifetime or breakdown of the light source element 4 from being caused by rise in the temperature of the light source element 4.

Furthermore, according to the present preferred embodiment, it is possible to prevent the reduction in the lifetime or breakdown of the light source element 4 by suppressing the power to be input to the light source element 4.

Moreover, according to the present preferred embodiment, the cooling mechanism driving portion 3 drives the cooling mechanism 5 in such a manner that the temperature of the cooling portion 5a of the cooling mechanism 5 maintains a higher temperature than the dew point temperature. Accordingly, it is possible to prevent the occurrence of condensation in the cooling mechanism 5. For this reason, water droplets are not generated due to the condensation. Therefore, it is possible to prevent a defect of a component failure from being caused. In other words, it is possible to prevent a defect such as a failure of peripheral components from being caused by the condensation.

Although the cooling mechanism 5 is the Peltier element in the present preferred embodiment, the present invention is not restricted thereto. The cooling mechanism 5 may be a water cooling mechanism using cooling water (a cooling mechanism of a water cooling type). The water cooling mechanism is a chiller device (a cooling mechanism of a chiller type), for example. The chiller device controls a temperature of chiller water, thereby carrying out cooling.

Moreover, the water cooling mechanism may be constituted by a heat exchanger and a fan, for example. In this case, the water cooling mechanism controls the number of rotations of the fan, thereby carrying out cooling. Also in this structure, according to the present preferred embodiment, it is possible to prevent the occurrence of the condensation in the cooling mechanism 5.

In addition, the cooling mechanism 5 may be a mechanism using fluorocarbon as a refrigerant (a cooling mechanism of a refrigerant type). The fluorocarbon is a refrigerant to be used in a refrigerator, an air conditioner or the like. With this structure, the cooling mechanism 5 includes a condenser, a compressor, a n expansion valve and the like. The cooling mechanism 5 carries out cooling by utilizing the fluorocarbon. Also in this structure, according to the present preferred embodiment, it is possible to prevent the occurrence of the condensation in the cooling mechanism 5.

Further, although the description has been given to the example in which the laser element is cooled as the light source element in the present preferred embodiment, the same effects can be obtained also when an LED (light emitting diode) or the like is applied to the light source element.

In the present invention, the preferred embodiment can be properly changed and omitted without departing from the scope of the present invention.

The present invention can be utilized as a light source apparatus capable of maintaining an element temperature of a light source element to be constant.

While the invention has been shown and described in detail, the foregoing description is in all aspects illustrative and not restrictive. It is therefore understood that numerous modifications and variations can be devised without departing from the scope of the invention.

What is claimed is:
1. A light source apparatus comprising:
a light source element for emitting light;
a light source element driving portion for driving said light source element;
a cooling mechanism for cooling said light source element;

an element temperature detecting portion for detecting an element temperature to be a temperature of said light source element;

an ambient temperature detecting portion for detecting an ambient temperature of said light source apparatus;

an ambient humidity detecting portion for detecting an ambient humidity of said light source apparatus;

a cooling mechanism driving portion for driving said cooling mechanism in such a manner that said element temperature to be detected by said element temperature detecting portion reaches a target temperature; and a control portion for calculating a dew point temperature of said cooling mechanism using said ambient temperature and said ambient humidity, and controlling said cooling mechanism driving portion and said light source element driving portion by using said calculated dew point temperature and said element temperature.

2. The light source apparatus according to claim 1, wherein said cooling mechanism includes a cooling portion for cooling said light source element; and said cooling mechanism driving portion drives said cooling mechanism in such a manner that a temperature of said cooling portion maintains a higher temperature than said dew point temperature in accordance with control of said control portion.

3. The light source apparatus according to claim 1, wherein said cooling mechanism includes a cooling portion for cooling said light source element, said cooling portion abuts on said light source element so as to generate a thermal resistance, said light source element driving portion applies a voltage to said light source element, thereby driving said light source element, said light source apparatus further comprises:

a light quantity detecting portion for detecting a light quantity of light to be emitted by said light source element, and said control portion controls said cooling mechanism driving portion and said light source element driving portion to control Ts and Id in such a manner that relational expressions of $Tr < Ts$ and $$Ts = Tj - (Vf \times Id - Po) \times \theta js$$

are satisfied, in which said dew point temperature is represented by Tr, a temperature of said cooling portion is represented by Ts, a voltage to be applied to said light source element is represented by Vf, a driving current of said light source element is represented by Id, said light quantity is represented by Po, said element temperature is represented by Tj and said thermal resistance is represented by $\theta js$.

4. The light source apparatus according to claim 1, wherein said cooling mechanism is a Peltier element.

5. The light source apparatus according to claim 1, wherein said cooling mechanism is a water cooling mechanism using cooling water.

6. The light source apparatus according to claim 1, wherein said cooling mechanism uses fluorocarbon as a refrigerant.

* * * * *